US012258811B2

(12) United States Patent
De Vita

(10) Patent No.: US 12,258,811 B2
(45) Date of Patent: Mar. 25, 2025

(54) DOOR WITH MAGNETIC SEAL

(71) Applicant: UNIFOR S.P.A., Turate (IT)

(72) Inventor: Leonardo De Vita, Turate (IT)

(73) Assignee: UNIFOR S.P.A., Turate (IT)

( * ) Notice: Subject to any disclaimer, the term of this patent is extended or adjusted under 35 U.S.C. 154(b) by 8 days.

(21) Appl. No.: 17/768,812

(22) PCT Filed: Oct. 14, 2020

(86) PCT No.: PCT/IB2020/059622
§ 371 (c)(1),
(2) Date: Apr. 13, 2022

(87) PCT Pub. No.: WO2021/074797
PCT Pub. Date: Apr. 22, 2021

(65) Prior Publication Data

US 2024/0093547 A1 Mar. 21, 2024

(30) Foreign Application Priority Data

Oct. 14, 2019 (IT) ........................ 102019000018683

(51) Int. Cl.
*E06B 7/20* (2006.01)
*E06B 3/46* (2006.01)
*E06B 7/21* (2006.01)

(52) U.S. Cl.
CPC ................ *E06B 7/21* (2013.01); *E06B 3/469* (2013.01); *E06B 7/20* (2013.01); *E05Y 2800/672* (2013.01)

(58) Field of Classification Search
CPC ................. E06B 7/18; E06B 7/20; E06B 7/21
USPC ......................................................... 49/478.1
See application file for complete search history.

(56) References Cited

U.S. PATENT DOCUMENTS 5,035,085 A * 7/1991 Mamelson .............. A47F 3/043 49/478.1
5,039,826 A * 8/1991 Newland ............. E05D 11/0081 49/478.1
5,161,329 A * 11/1992 Brown ....................... E06B 1/32 49/470
(Continued)

FOREIGN PATENT DOCUMENTS

CN 101852057 1/2012
EP 2402545 1/2012
(Continued)

OTHER PUBLICATIONS

International Search Report, issued in PCT/IB2020/059622, mailed Dec. 18, 2020.
(Continued)

*Primary Examiner* — Daniel J Troy
*Assistant Examiner* — Susan M. Heschel
(74) *Attorney, Agent, or Firm* — Ferguson Case Orr Paterson

(57) ABSTRACT

Described herein is a door with a magnetic sealing mechanism. The door leaf houses a sliding element (guillotine) made from a material with low magnetic interaction. This guillotine has two magnets: the first keeps the guillotine retracted within its seat, while the second, when near a magnet interaction element on the door frame, pulls the guillotine out to create a tight seal when the door is closed. The second magnet's pull is stronger than the first, ensuring effective sealing.

20 Claims, 18 Drawing Sheets

(56) References Cited

U.S. PATENT DOCUMENTS

| | | | | | |
|---|---|---|---|---|---|
| 5,975,664 | A * | 11/1999 | Banicevic | F25D 23/087 | 49/478.1 |
| 8,429,929 | B2 * | 4/2013 | Aragon | E06B 1/04 | 49/478.1 |
| 9,052,135 | B2 * | 6/2015 | Trulaske, Sr. | F25D 23/028 | |

FOREIGN PATENT DOCUMENTS

| | | |
|---|---|---|
| EP | 2402546 | 1/2012 |
| JP | 2000120355 | 4/2000 |

OTHER PUBLICATIONS

International Written Opinion, issued in PCT/IB2020/059622, mailed Dec. 18, 2020.

* cited by examiner

DOOR WITH MAGNETIC SEAL

CROSS-REFERENCE TO RELATED APPLICATIONS

This application is a National Phase Application of PCT International Application No. PCT/IB2020/059622, having an International Filing Date of Oct. 14, 2020 which claims the benefit of priority to Italian Patent Application No. 102019000018683, filed Oct. 14, 2019, each of which is hereby incorporated by reference in its entirety.

FIELD OF THE INVENTION

The present invention relates to a door having a leaf provided with a seal for the sealing, mainly acoustic sealing, thereof, when closed on the door frame or fixture. In particular, the present invention relates to doors with leaves having so-called magnetic seals, or in other words, draft-stops (or in German Zugluft-Stopp) or magnetically-activated seal guillotines.

In particular, the present invention relates to solutions which are adapted to doors with hinged leaves but also in particular to doors with sliding leaves.

Furthermore, the present invention relates to solutions which are adapted to doors of partition walls of the so-called movable type, i.e. not masonry, but made of metal and glass frames, conventionally for delimiting rooms in offices.

The need is strongly felt, especially for doors of movable glass walls, for seal solutions which are not very cumbersome, meaning both the volume thereof and the little visibility thereof for the end user of the office, and are simultaneously capable of an increased acoustic insulation.

BACKGROUND ART

The known seals or draft-stops are mainly designed to close the small leaf openings, called drafts or unfinished openings, which remain between the door and the abutment element thereof or the floor, so as to limit the passage of air and therefore, for example obtain good thermal insulation.

However, the need is strongly felt, especially for the partition walls of offices, to have an adequate acoustic insulation, especially if the doors are intended to delimit common areas or meeting areas.

A further strongly felt need, contrasting with the one of acoustic insulation, is the need to limit the effort the user is to exert to close and open the door, overcoming the action of damping devices which accompany closing the door to avoid impacts, and also the mechanisms for actuating the guillotines or draft-stops. Obviously, the easier it is to open and close the door, the more difficult it is to obtain adequate acoustic insulation between the door and the fixture thereof or door frame, especially if it is of the sliding type.

The solution described in document JP2005009278 relates to a seal which allows preventing the passage of air currents and humidity through the floor drafts of the door by blocking a space between a surface of the floor and the door. The solution proposed relates to a door which cooperates with a perfectly flat floor, i.e. with no difference in level along the extension of the doorstep.

In this solution, a sealing mechanism is pushed downwards to close the space between the door and the floor.

The seal is activated by a magnet push button which is attracted by the door frame, as the door closes thereon. By activating the push button, the position of first magnets is moved, which results in the positioning of the poles of equal polarity thereof on facing magnets positioned in the seal, repelling the seal and forcing it to descend towards the floor.

The pair of magnets of the push button is to be strong enough to overcome the magnetic force between two pairs of magnets facing each other and positioned in the door and in the seal, in addition to the force of the horizontal return spring of the push button. Furthermore, the action of the push button has to be greater than the one of return springs of the seal in raised position. Therefore, the force to overcome in leaf opening step, which is added to that of the accompanying closing or soft-close systems usually provided on doors of a given weight such as glass and acoustic ones, results in a significant entity which limits the usability of the door, i.e. the ergonomics of the door itself, and therefore the comfortable use of the door.

Overall, this known solution is bulky and the operation thereof is delicate. For example, in the event of an accidental blow to the door, the magnet of the push button could move, thus activating the seal exiting the leaf, in particular if the door is of the sliding type, thus being unreliable to use. To reduce these risks, there is a need to provide for the elastic means (return springs of the push button and the seal) to have significant force, thus further increasing the discomfort in using the door.

Therefore, the need strongly remains for a solution which allows the resistance of the door to opening given by the soft-close devices to be slightly increased, and in particular, the need is felt to avoid elastic means and activation push buttons which create operating inaccuracy and forces contrasting the movement of the door by resisting the closing and/or opening of the door, and also an increased volume which moreover is highly visible and unacceptable for glass doors like the ones often used to close offices.

A solution is known from document EP0451732B1, which provides two mutually associated magnetic bars, one installed on the leaf of the door, the other installed fixed on a doorstep fixed on the floor, so that when the door is closed, one of them is extracted by the mutual magnetic attraction like a slide, is positioned on the other magnetic rod so that the space below the door is closed.

The movable element, which induces the sealing, is a profiled magnetic rod made of magnetized material which is not hard, therefore slightly soft. The magnetic rod extends over the whole length of the leaf.

The left half of the magnet—in section with respect to the longitudinal extension of the magnet—directed towards the opening side of the door is the area of the south pole, the right half is the area of the north pole.

The magnetic rod is received by a groove of a profile of the door leaf so that it is a sliding part and is movable downwards.

The magnetic rod is associated with a flat magnetic rod, positioned on the floor on the doorstep, which has, in section, an inverse polarization, i.e. the south pole part is on the side of the fixture, the north pole part on the opening side of the leaf.

The profile of the doorstep is fixed on the floor with screws.

In this known solution, the doorstep at times forms an unacceptable obstacle in spaces also adapted to disabled persons.

Furthermore, the provision of a magnetic-material seal adapted to slide in the seat thereof provided in the door leaf and soft to have an insulating effect makes this seal very delicate and easily worn over time, thus losing the features of accurate operation and insulation thereof. In particular, the sliding action of the magnetic seal against the walls of the seat wear the sides thereof, making the downwards and upwards operation thereof more inaccurate, and if it is very worn, also resulting in the jamming of the movement.

Again furthermore, this known solution is difficult, if not impossible, to use in a sliding door.

The magnets are horizontal and oriented with constant course of the poles over the entire horizontal section, from seal beginning to seal end. If applied to a sliding door, as soon as the seal overlaps the magnetic rod on the floor at the beginning of the horizontal sliding of the door, it starts to descend, limiting the possibility of the leaf itself from sliding. Likewise, it is unlikely for the sliding doors in complete open step to completely overlap the fixed module of the side wall, this to ensure that a handle may be positioned on the leaf, and the distance of the handle from the fixed upright is in any case to remain a few tenths of centimeters so as to avoid accidents and allow the maneuverability and visibility of the locations by disabled persons. This would make it impossible to overlap the two magnetic rods and obtain the sealing of the space located below the sliding door.

Other solutions are known from documents JP2005009278, WO2018128824A1, EP0784144, U.S. Pat. No. 5,396,734, EP0216022, DE3708176, EP0451732, WO8101166, FR1363546, U.S. Pat. No. 4,703,586, DE3708176, DE102017127642, DE102016122265, EP3290627, DE4010994. However, none of these solutions is adapted both to hinged and sliding doors and is capable of limited volumes and limited visibility, as well as ergonomic activation.

Therefore, the need remains strongly felt for a solution which is adapted both to doors with hinged leaf and to the sliding ones, and which is simple but safe to activate only with the leaf in closed position and so as to cover the whole opening of the door, as well as simple and safe to operate with reduced wear over time.

Solution

It is the object of the present invention to provide a door capable of resolving the drawbacks of the solutions of the known art and simultaneously meet the aforesaid unsolved needs.

These and other objects and advantages are achieved with a door as described and claimed herein.

Further embodiments are the object of the dependent claims.

By virtue of the proposed solution, a door may be obtained which is both adapted to the solutions having hinged leaf and those with sliding leaves, which is simple but safe to activate only with the leaf in closed position and so as not to jam or wear the seal and so as to cover the whole opening of the door, as well as simple and safe to operate with reduced wear over time.

By virtue of providing a dual series of magnets, the force exerted both in extension and in retraction of the guillotine may be adjusted in a highly accurate manner so that the action of the guillotine is hardly perceivable when opening and closing the door leaf.

By virtue of the solution proposed, the guillotine may be activated, i.e. the guillotine may be extracted so that the leaf acts as acoustic seal against the fixture or wall frame only when the second magnet is aligned with the interaction element, thus making the extraction movement of the guillotine highly accurate, obtaining a safe and accurate acoustic seal, as well as a reduced force perceived by the user. Also the separation, i.e. the interruption, of the interaction between the second magnet and the interaction element occurs in an accurate and quick manner since, for example for the guillotine facing the floor, the second magnet is moved away transversely and suddenly from the interaction element. In other words, by virtue of the solution proposed, the guillotine is only activated when the door leaf is exactly in closing position, and therefore the guillotine, or the seal placed thereon, is prevented from sliding, thus only allowing an adequate sealing rest on the abutment.

By virtue of the solution proposed, hindrances such as a doorstep are avoided from being put on the floor, thus avoiding stumbling elements for a user who is to cross the open doorway.

Furthermore, the solution proposed is very compact, i.e. not very bulky, and does not have elastic elements, thus being highly simple to assemble and service.

The solution proposed allows the plane of the door leaf to be kept very close to the plane defined by the fixture or door frame, thus reducing overall volumes of the door, especially if of the sliding leaf type.

In particular, in the event of a door with sliding leaf, a narrow, space-saving and accurate sliding foot may be used by virtue of the proposed solution.

FIGURES

Further features and advantages of the door of the invention will become apparent from the following description of preferred embodiments thereof, given by way of non-limiting example, with reference to the accompanying drawings, in which.

Figure 1:
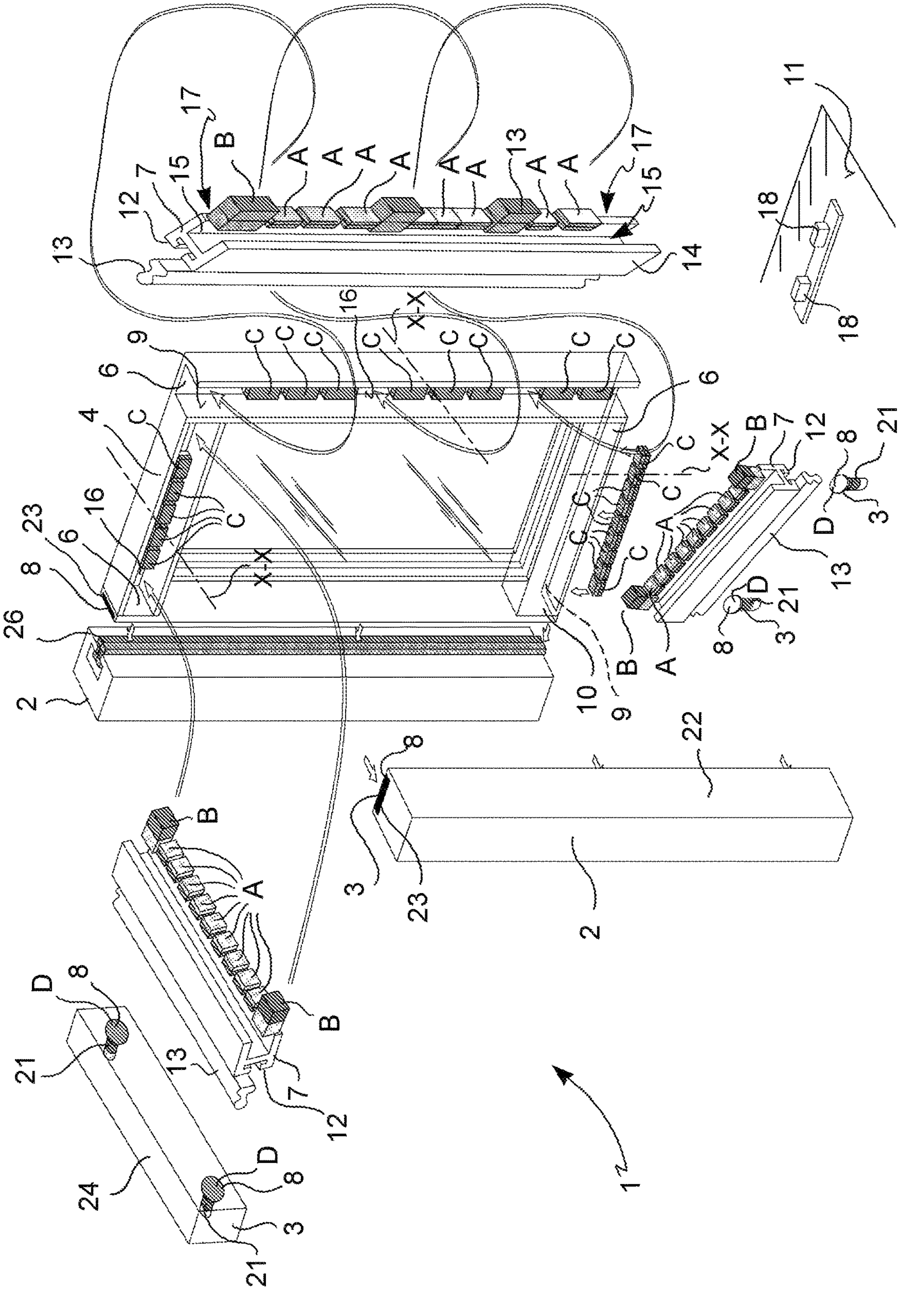
FIG. 1 shows an axonometric view, with separate parts, of a door with sliding leaf associated with a door frame, it also having separate parts, and in which the door leaf is partially made of glass and has a frame in which seats are formed which accommodate sliding guillotines on three sides in an extendible manner when facing said door frame, with the leaf in closed position.
Figure 2:
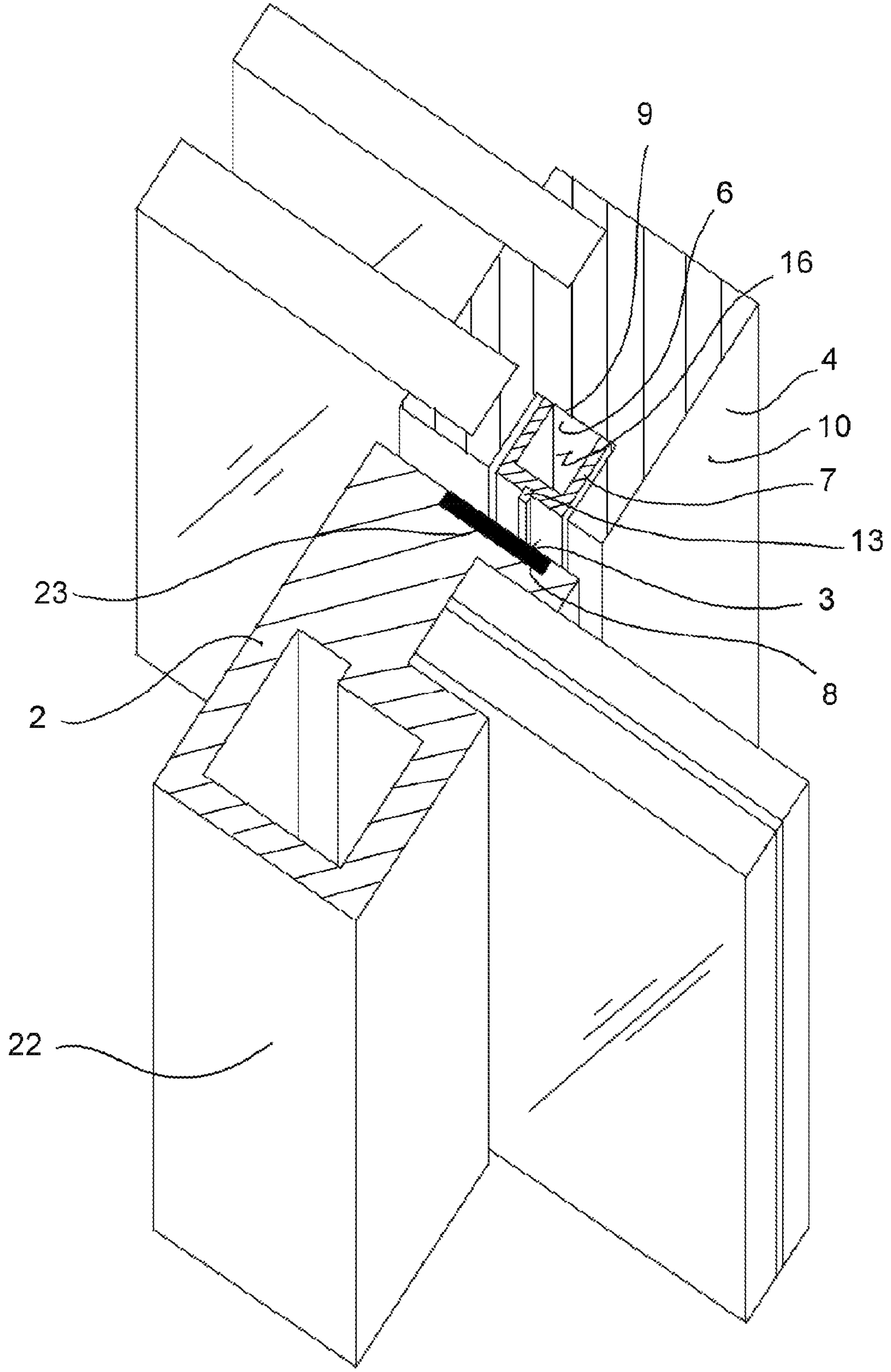
FIG. 2 shows a sectional axonometric view of a detail of a double-pane sliding leaf with the rear edge thereof facing the upright of the door frame, depicting the first moment in which the guillotine housed in the seat provided in the leaf begins the sliding thereof to abut against the second magnet interaction element, here a strip made of material having a high magnetic interaction.
Figure 3:
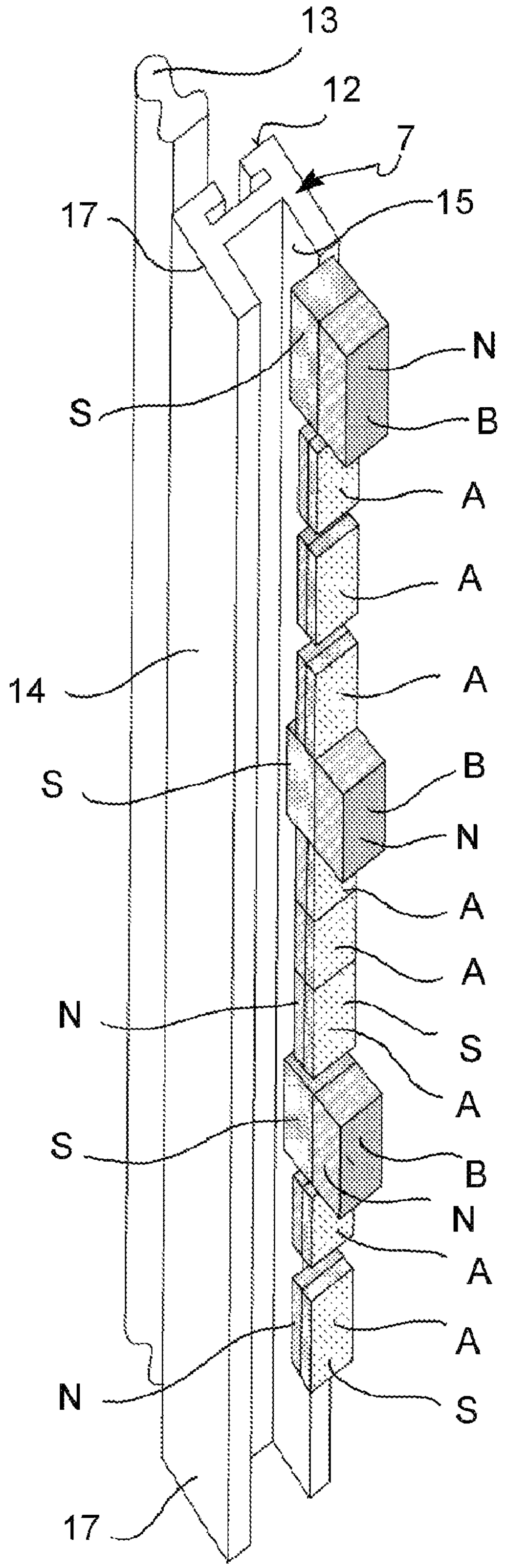
Figure 5:
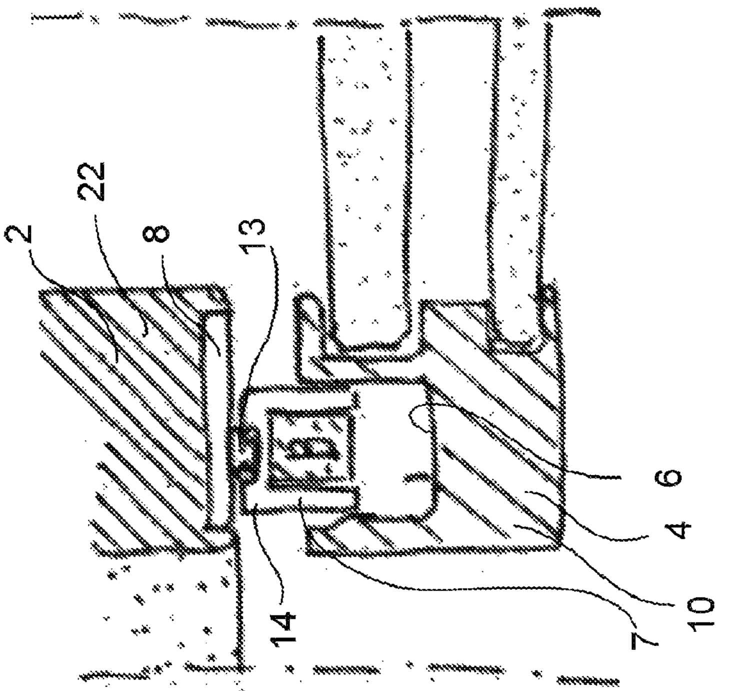
Figure 4:
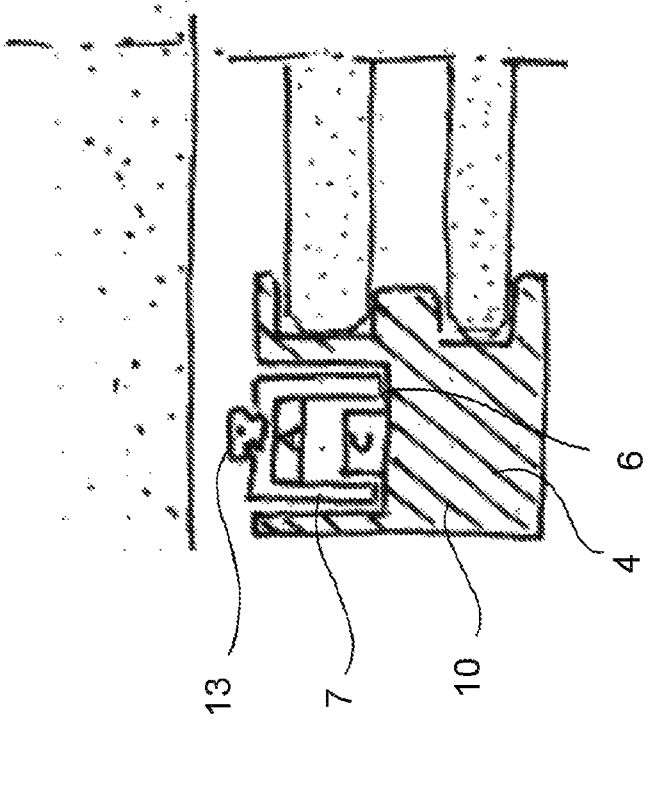
Figure 6:
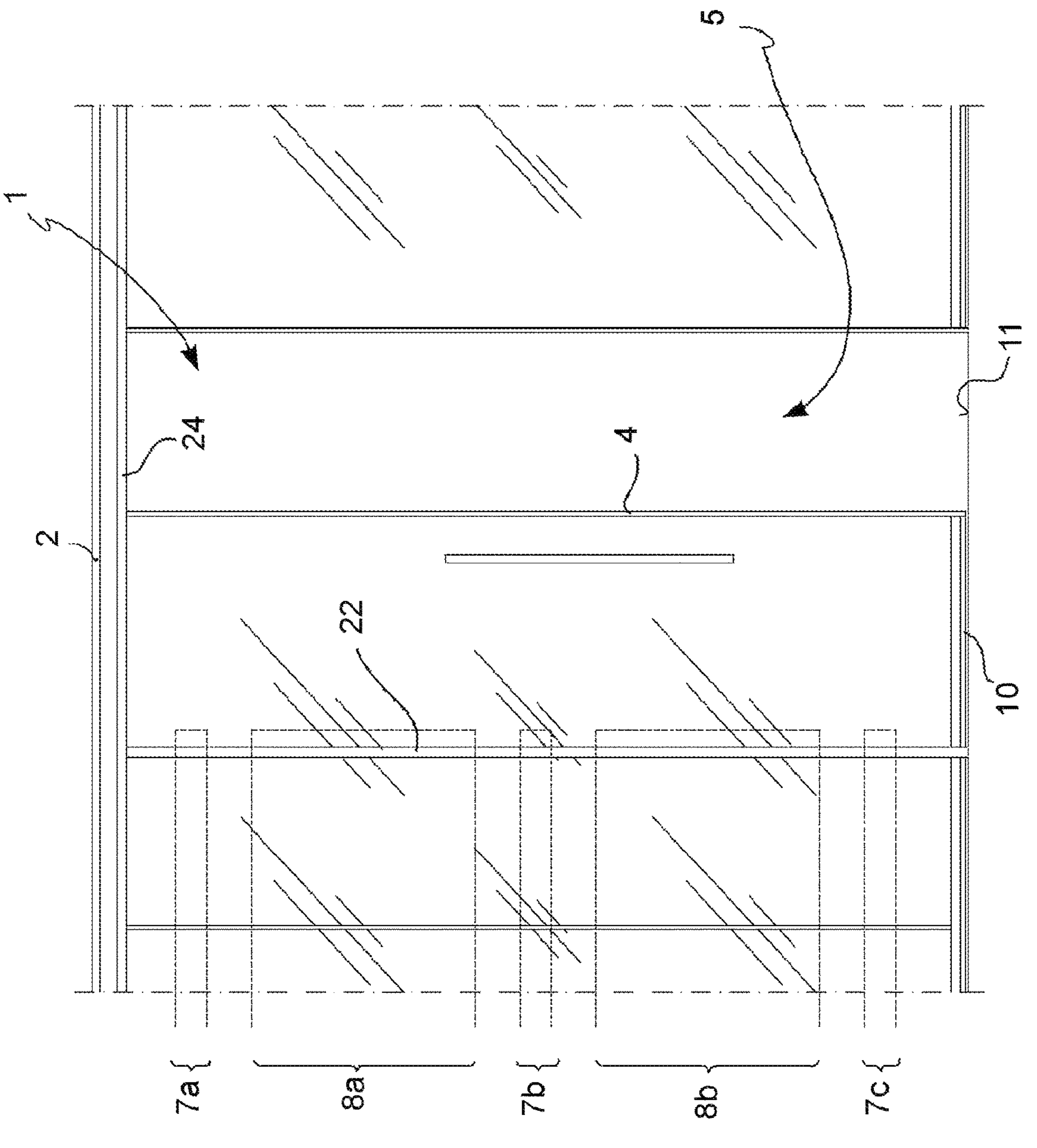
Figure 7:
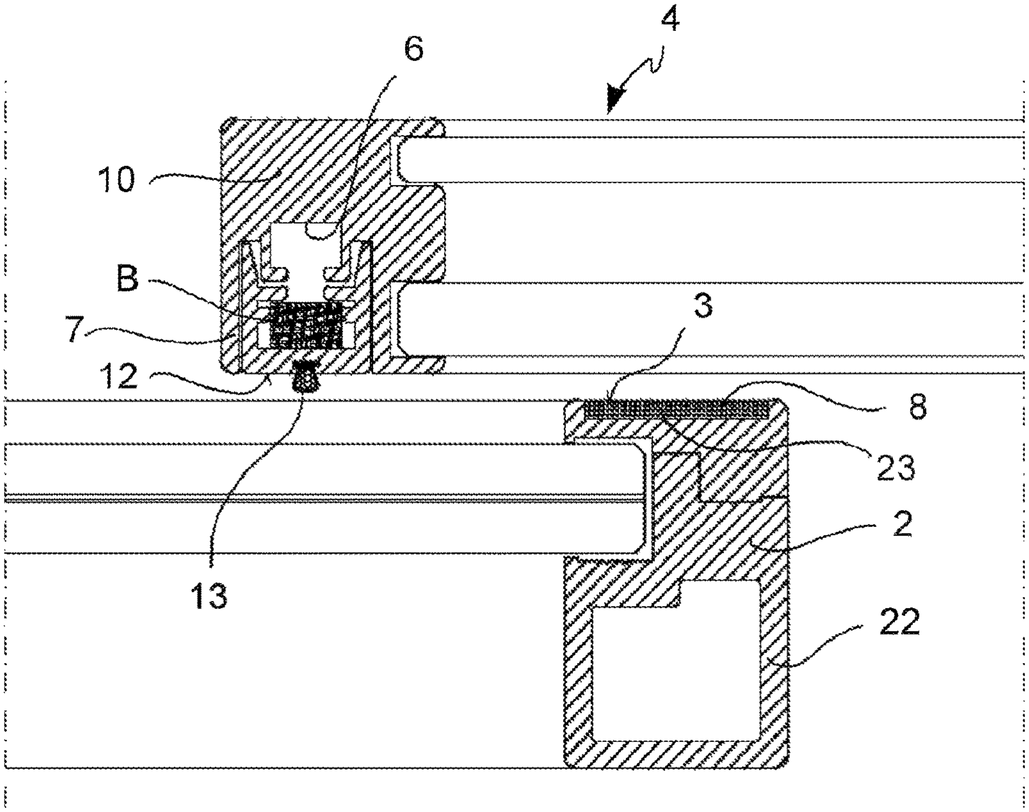
Figure 8:
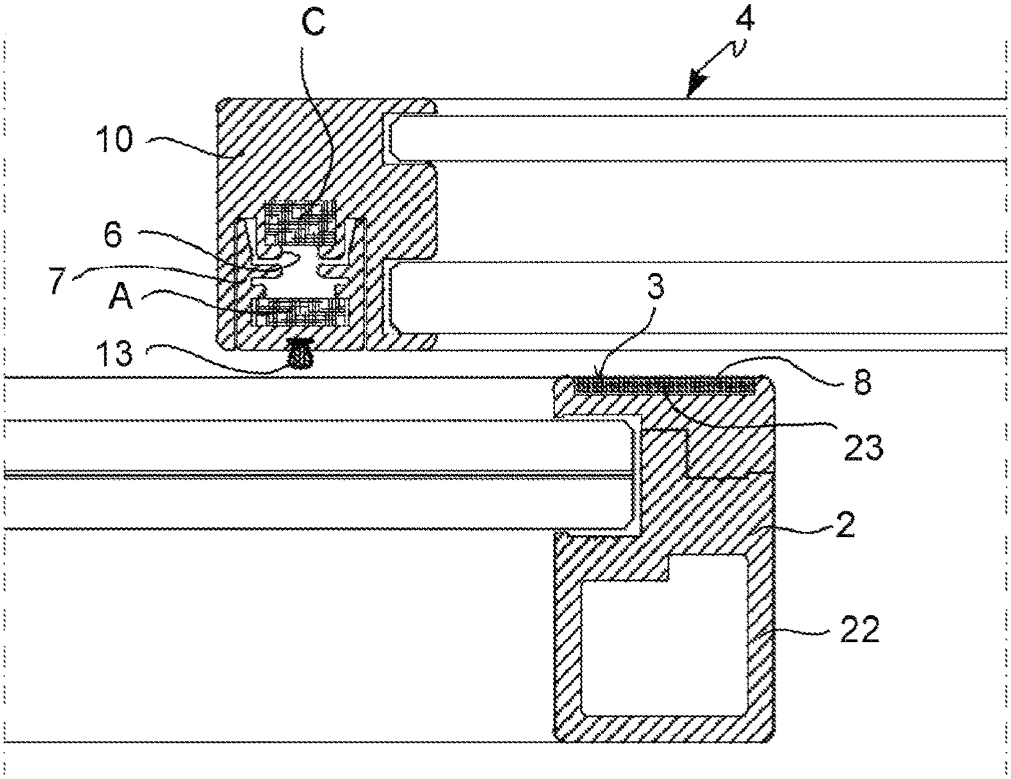
Figure 9:
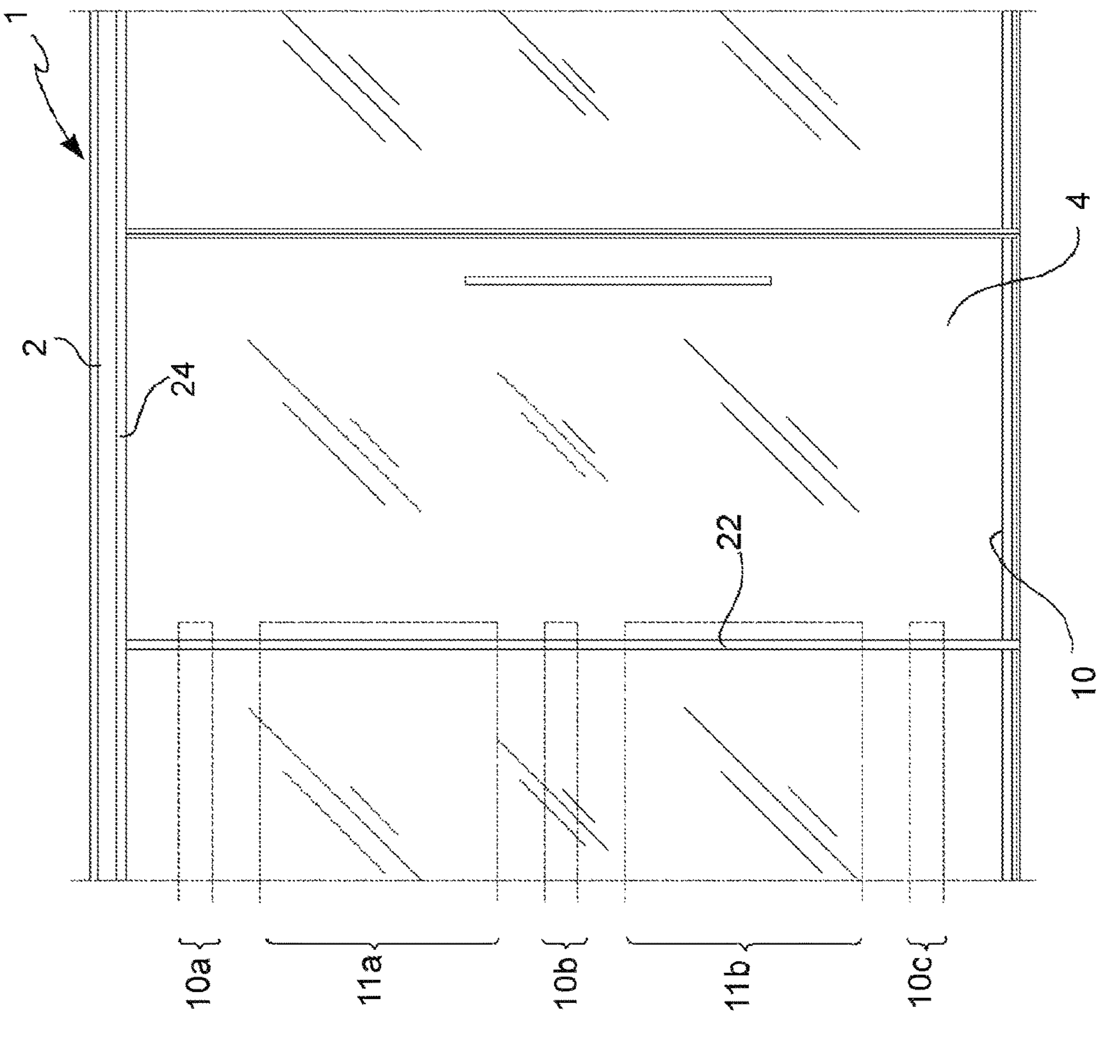
Figure 10:
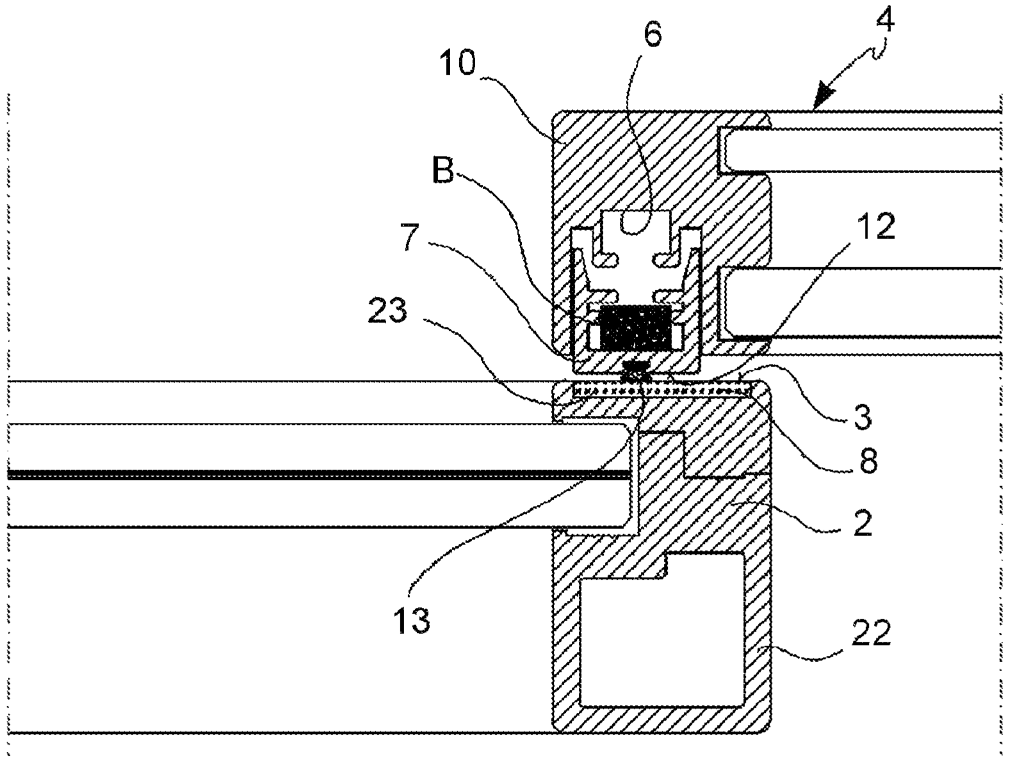
Figure 11:
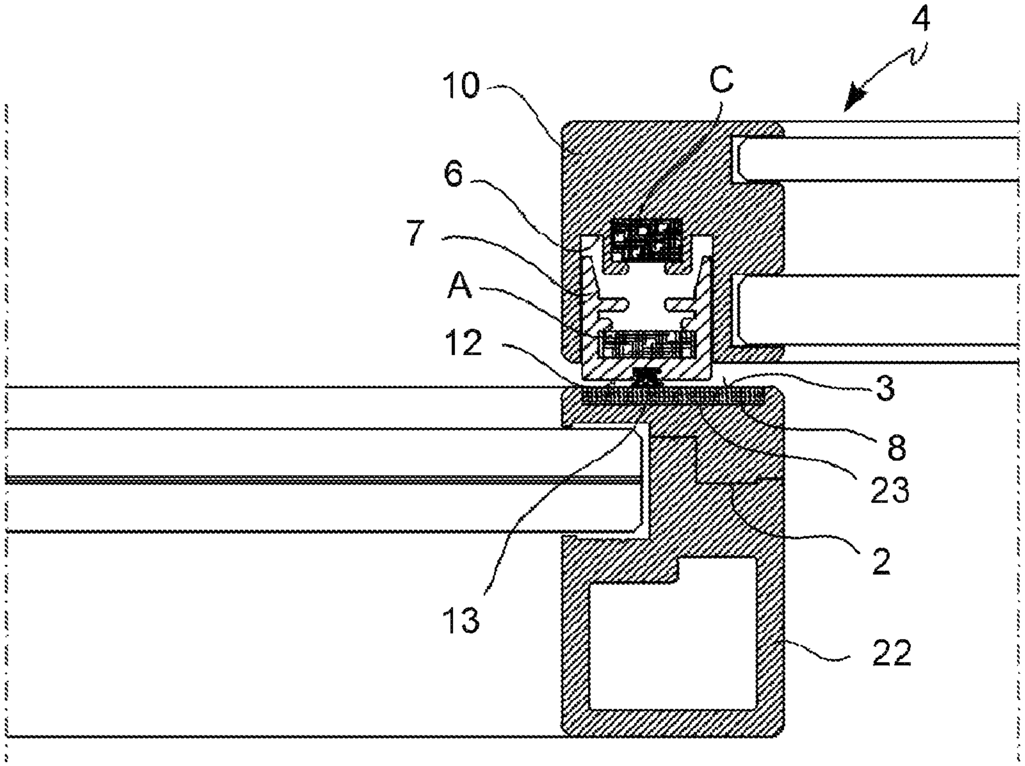
Figure 12:
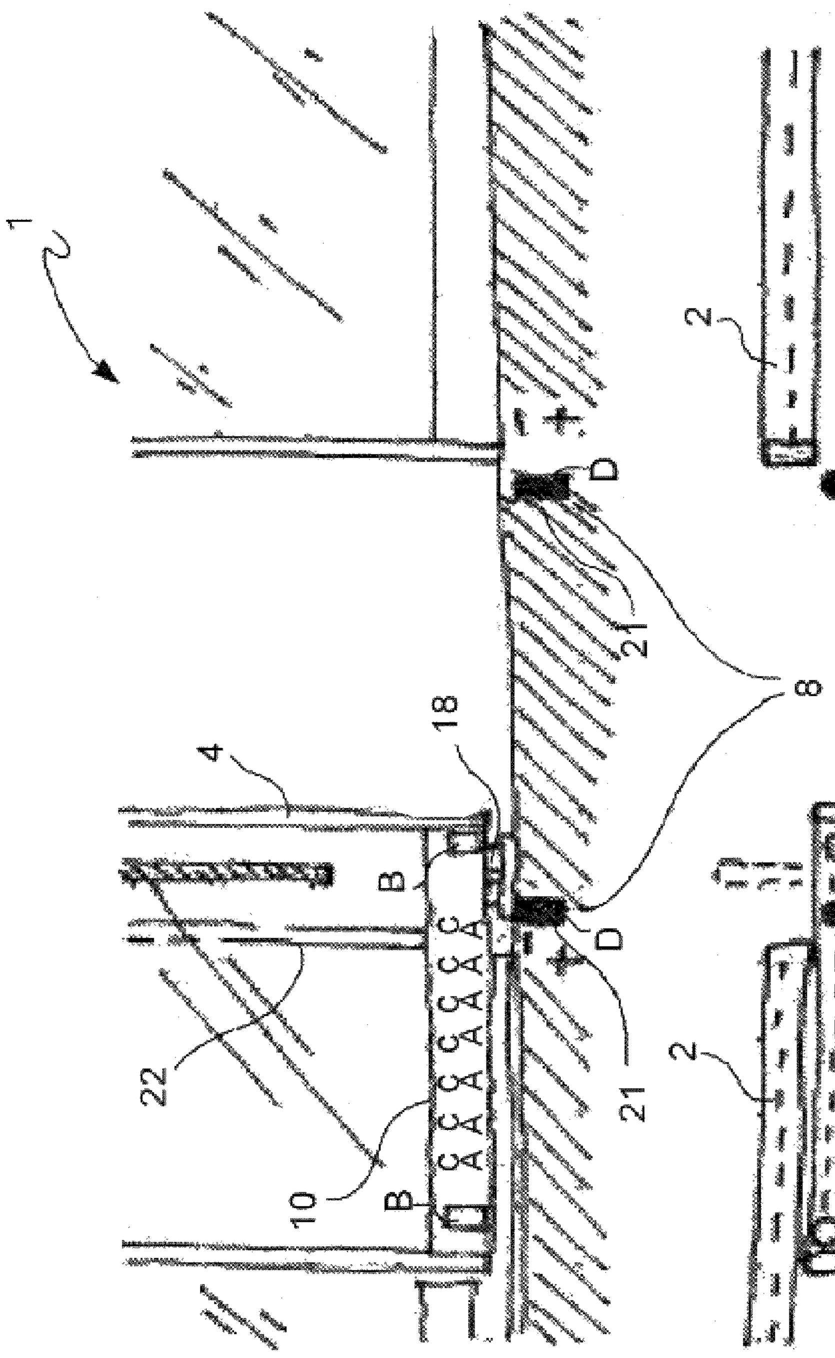
Figure 13:
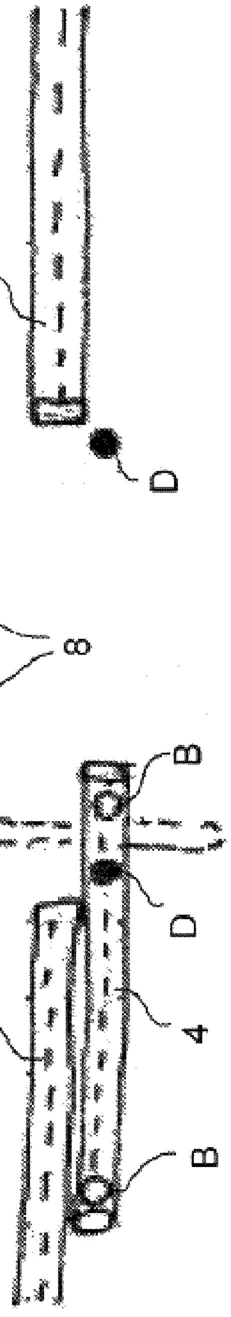
Figure 14:
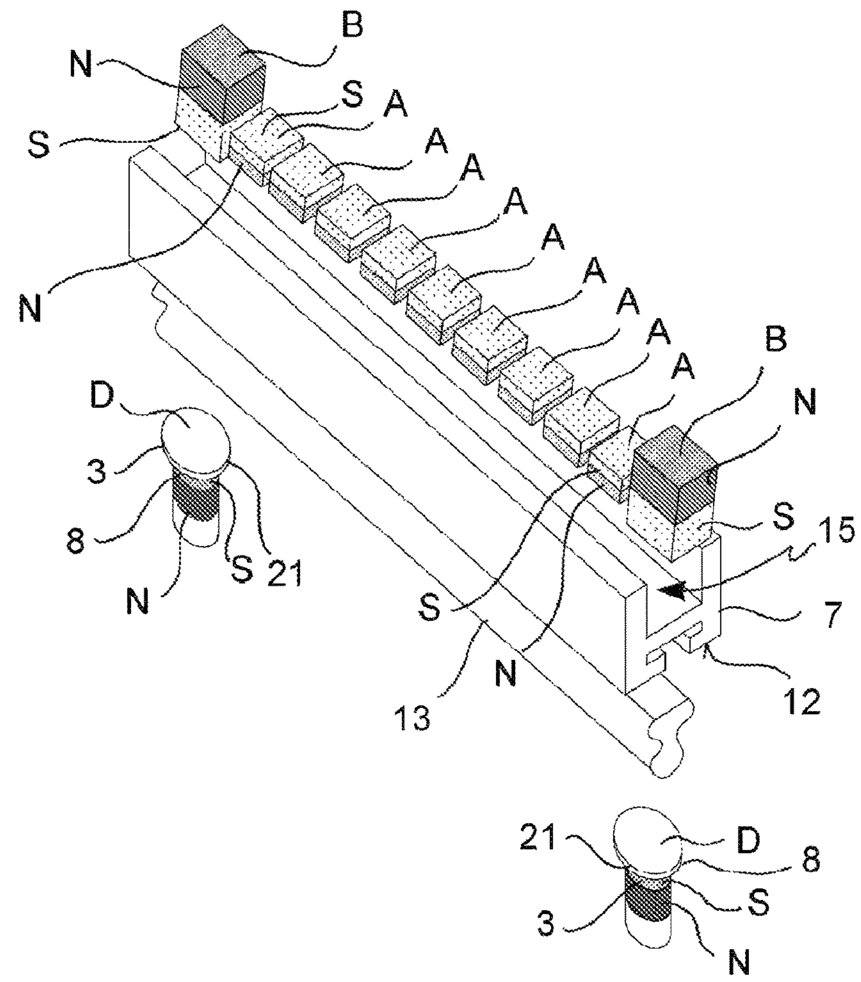
Figures 15, 16, 17:
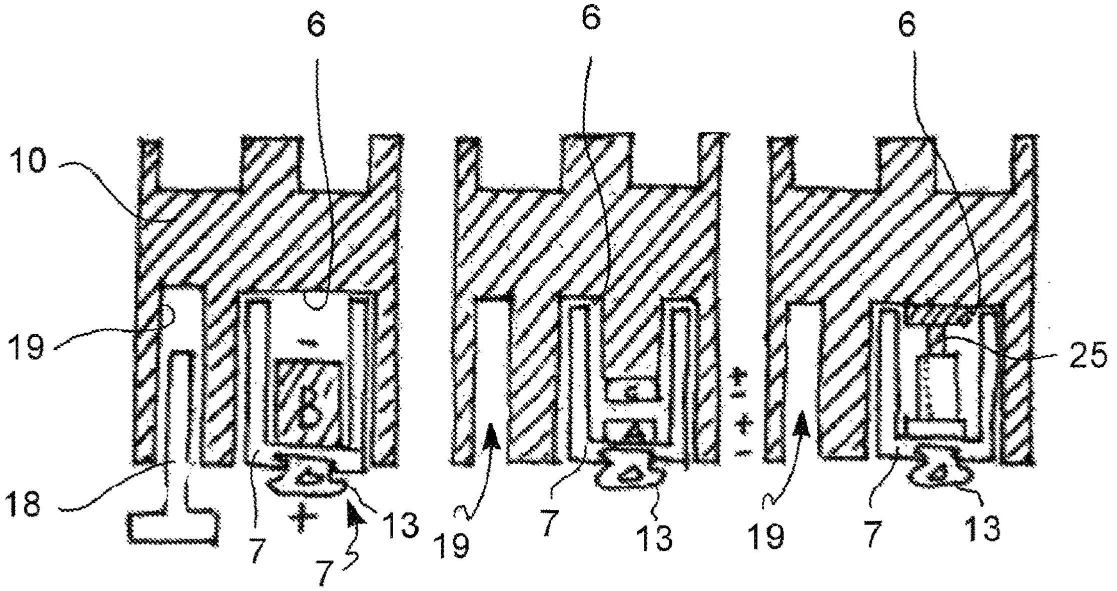
Figure 18:
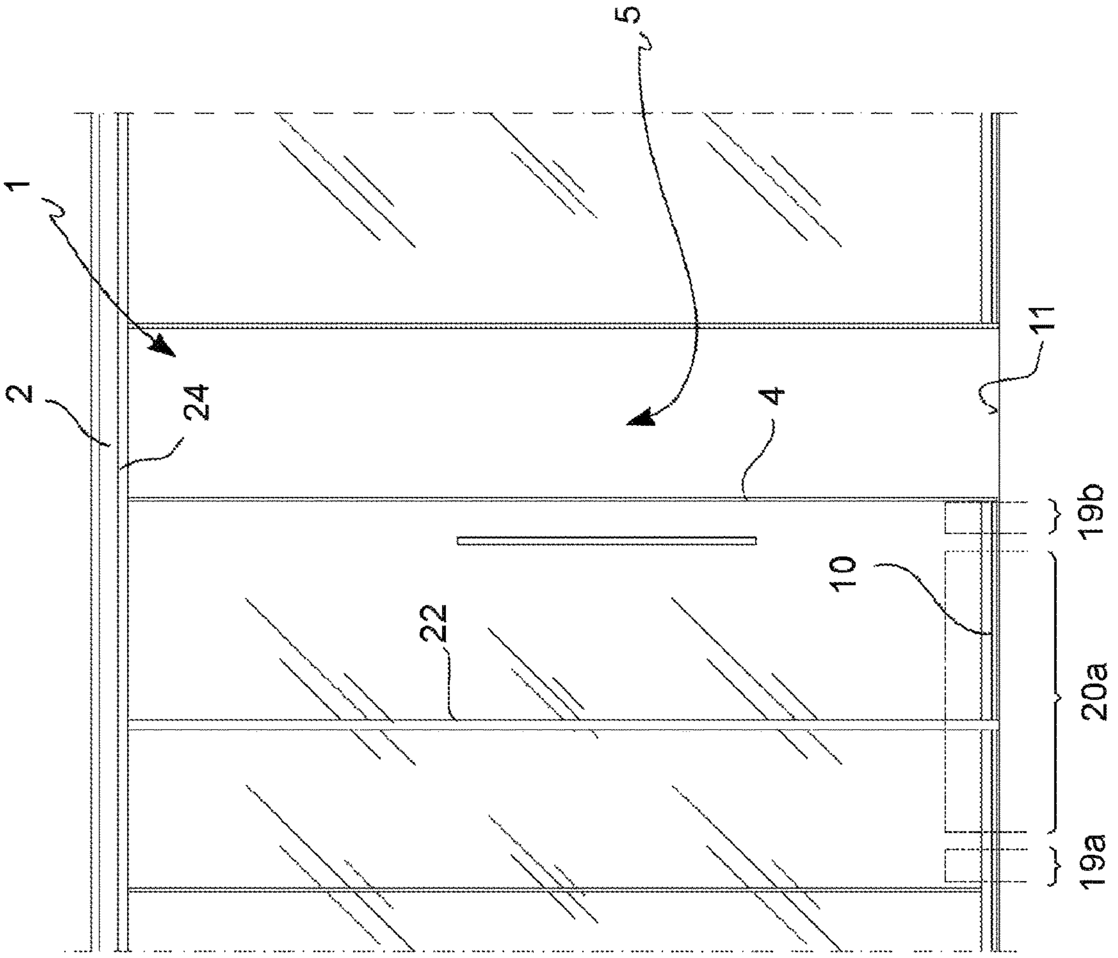
Figure 19:
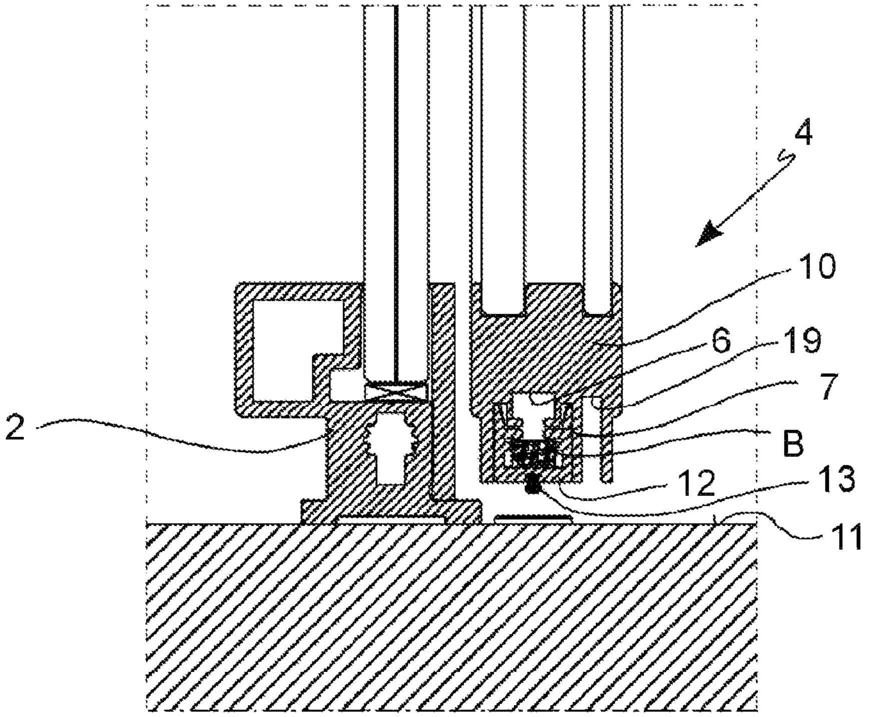
Figure 20:
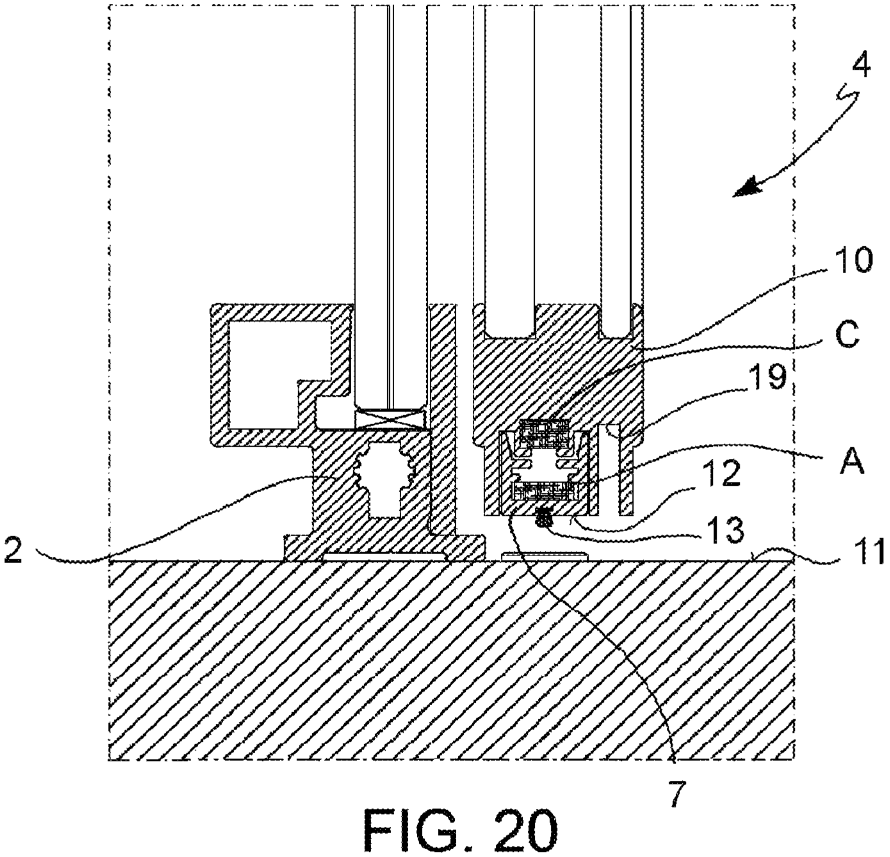
Figure 21:
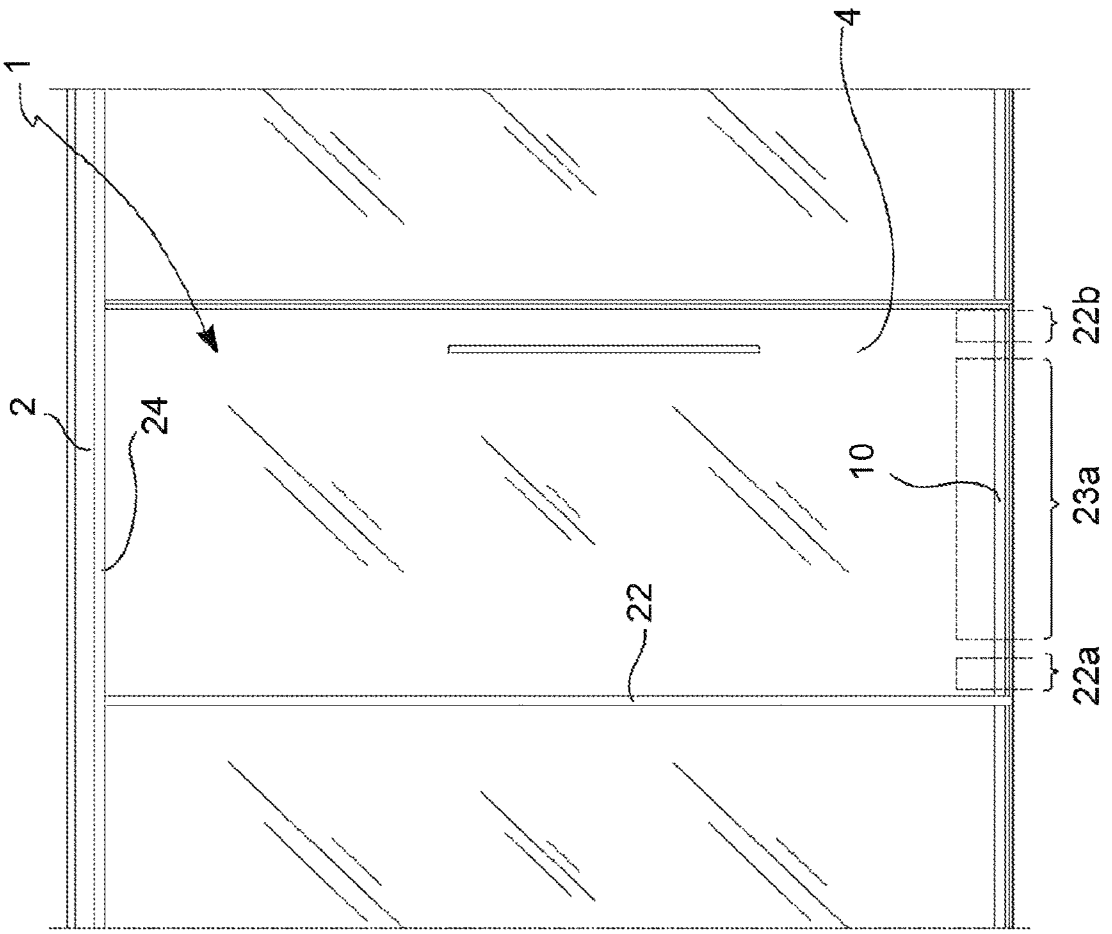
Figure 22:
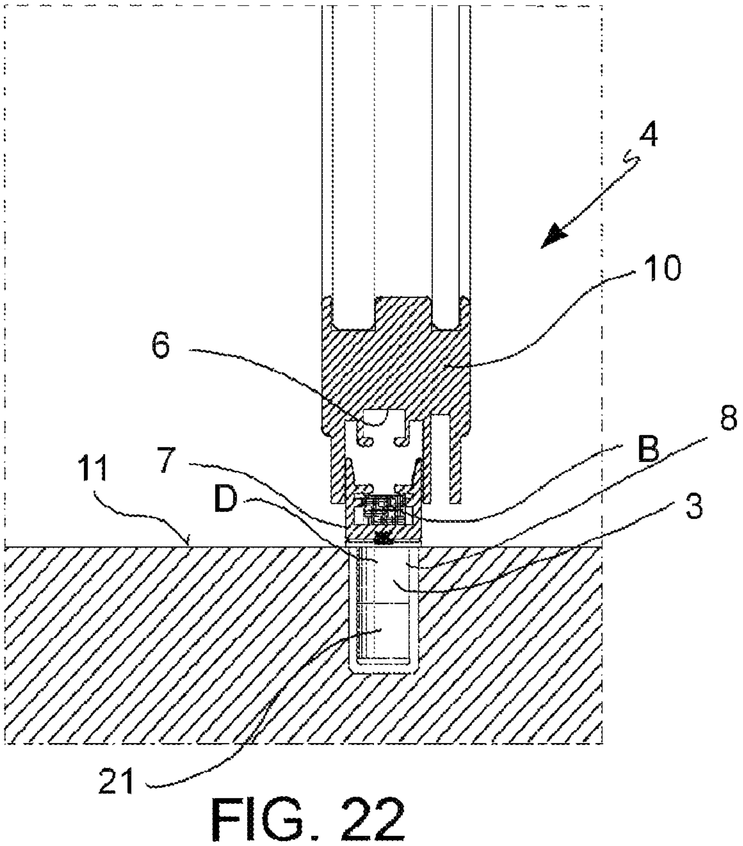
Figure 23:
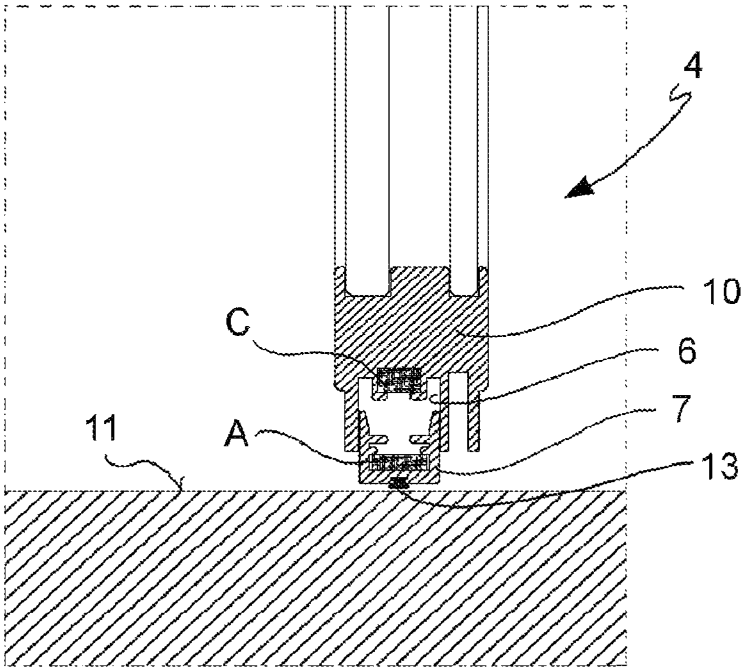
Figure 24:
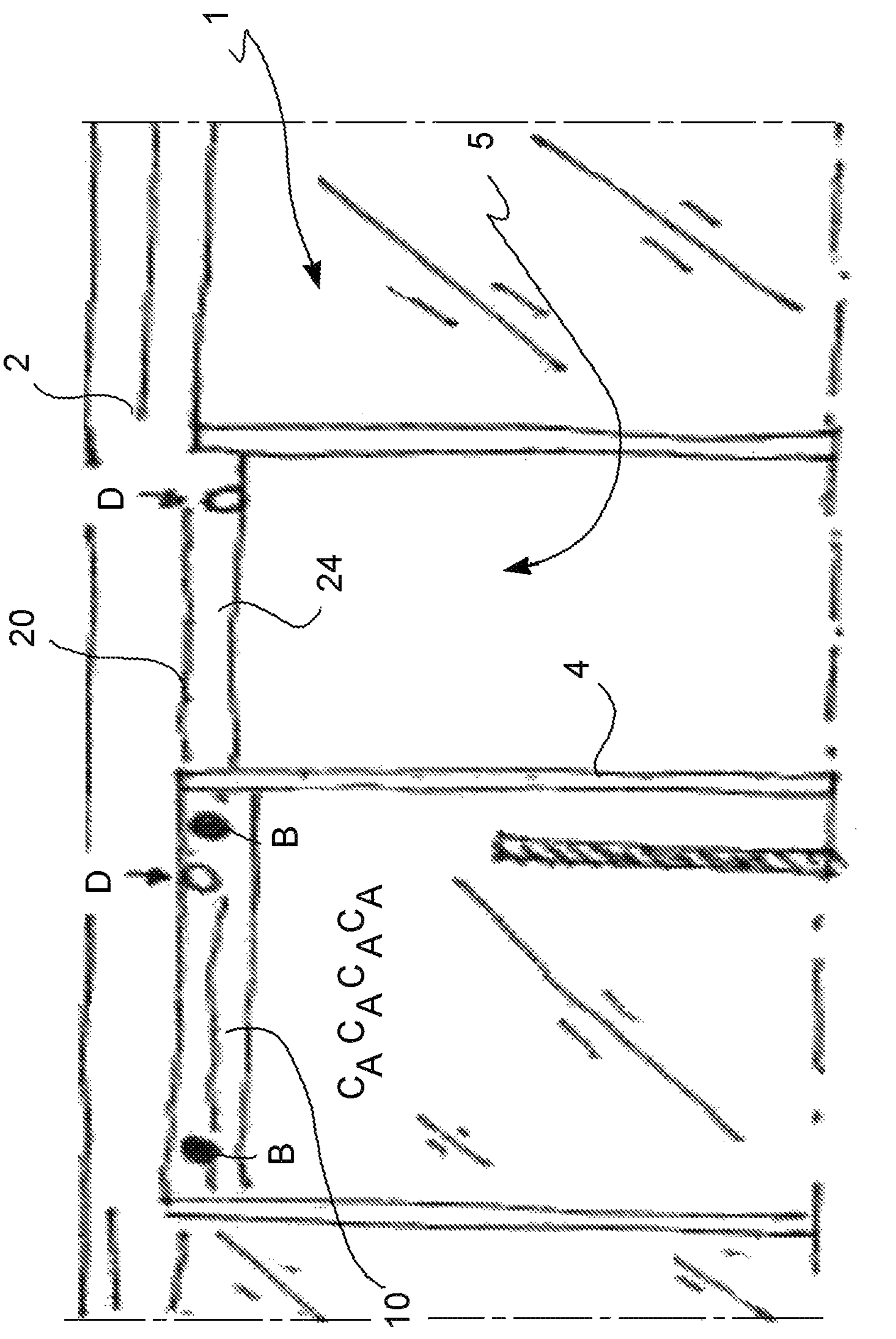
Figure 25:
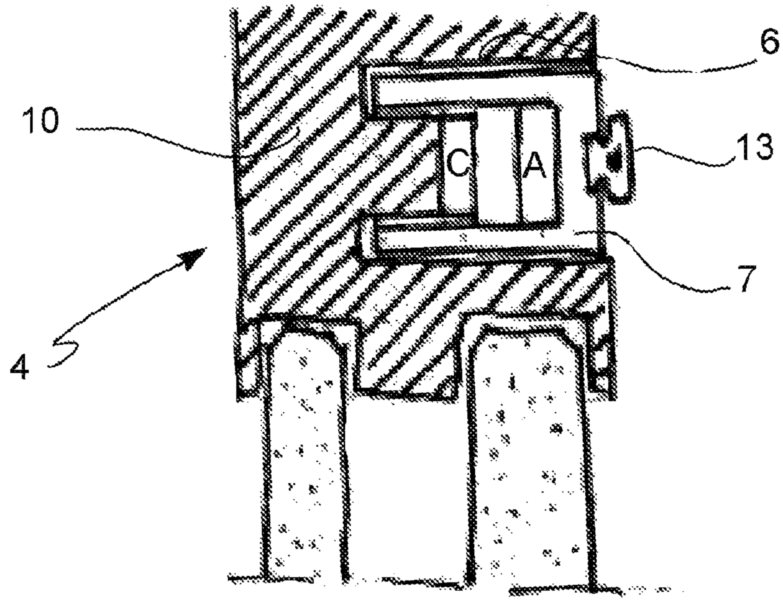
Figure 26:
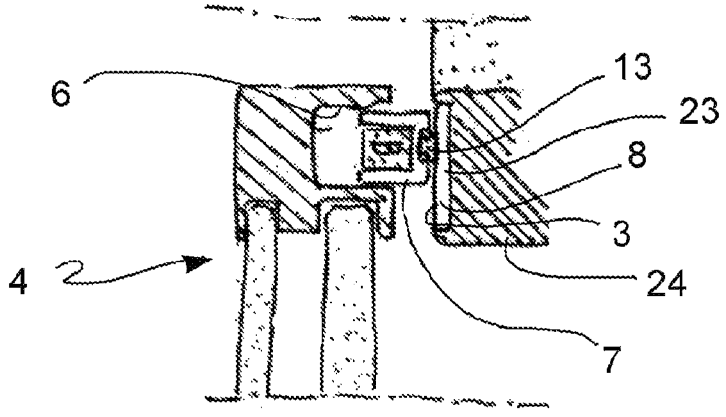
Figure 27:
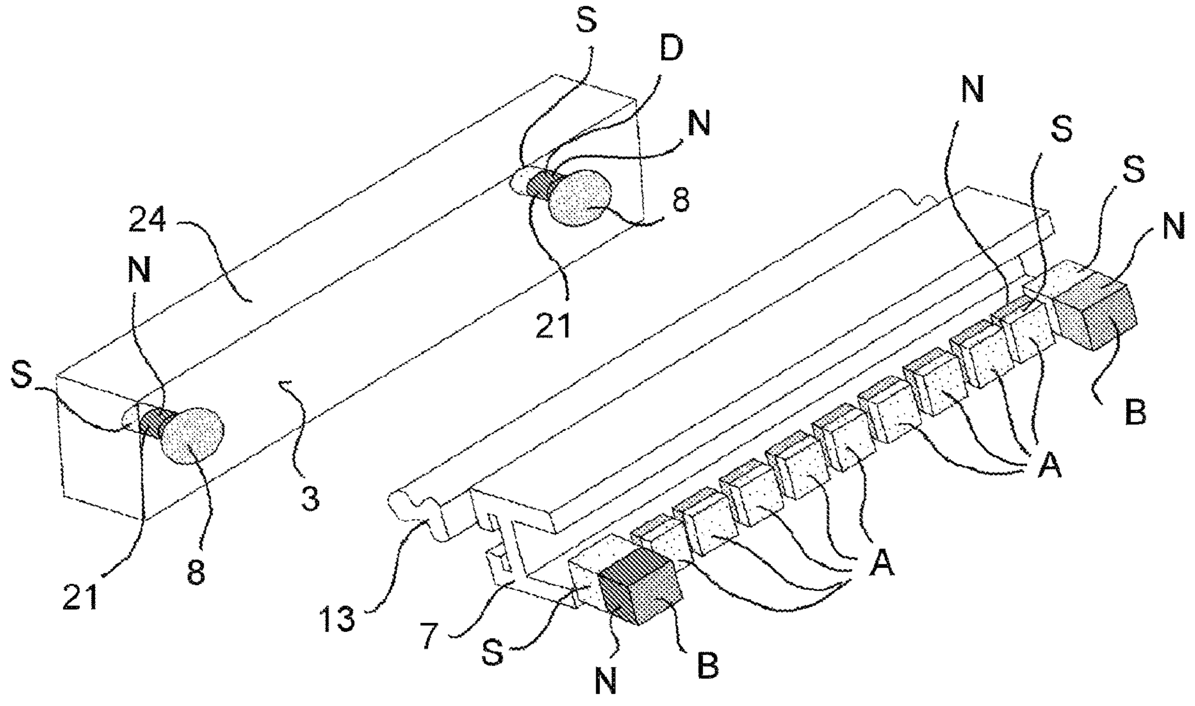
Figure 28:
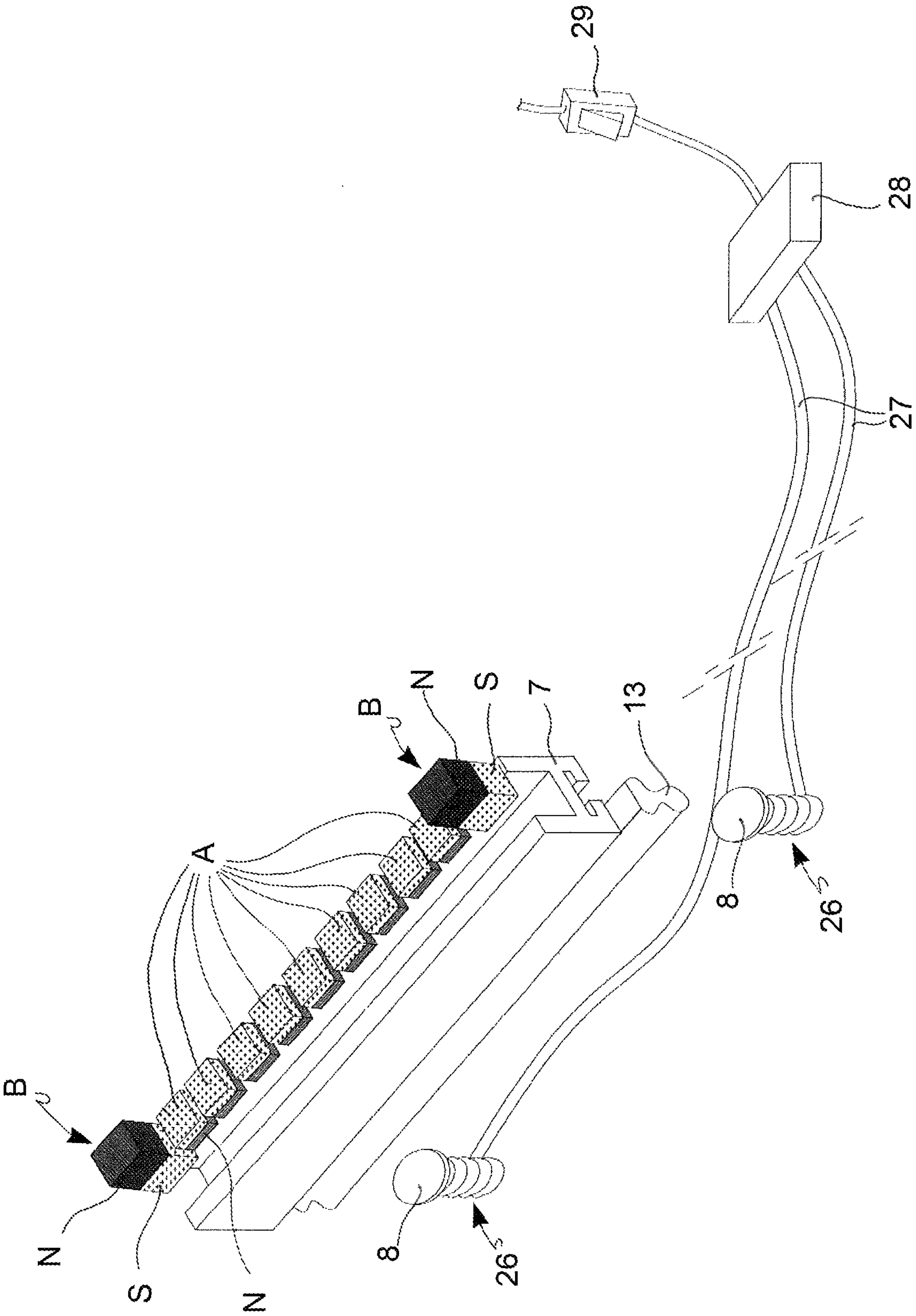

FIG. 3 shows an axonometric view, with separate parts, of the guillotine adapted to interface with the second magnet interaction element of an upright of a door frame, in which there is noted the plurality of first magnets fixed to the guillotine and adapted to the retraction thereof in the seat of the door leaf, as well as the plurality of the second magnets adapted to extract the guillotine when the guillotine is aligned with the second magnet interaction element in the door frame;

FIGS. 4 and 5 show two sections of two details of the leaf in which the rear edge of the leaf is depicted in two moments, a first moment in which the guillotine, housed in the seat provided in the leaf, is not facing the upright of the door frame and in which the at least one first magnet is attracted by the third magnet arranged in the bottom wall of the seat of the leaf, thus keeping the guillotine in completely retracted position, and a second moment in which the guillotine is completely extended and abutting against the second magnet interaction element, here a strip made of material having a high magnetic interaction to which the at least one second magnet is attracted;

FIG. 6 shows a side view of a door with sliding leaf, in partially open position;

FIG. 7 shows a section of an edge of the leaf and of the door frame, inserted in a glass wall, of an area among those indicated by 7*a*, 7*b* and 7*c* in FIG. 6;

FIG. 8 shows a section of an edge of the leaf and of the door frame, inserted in a glass wall, of an area among those indicated by 8*a* and 8*b* in FIG. 6;

FIG. 9 shows a side view of a door with sliding leaf, in completely closed position;

FIG. 10 shows a section of an edge of the leaf and of the door frame, inserted in a glass wall, of an area among those indicated by 10*a*, 10*b* and 10*c* in FIG. 9;

FIG. 11 shows a section of an edge of the leaf and of the door frame, inserted in a glass wall, of an area among those indicated by 11*a* and 11*b* in FIG. 9;

FIGS. 12 and 13 show a side view and a top view of a detail close to the floor of a door with sliding leaf associated with a glass wall, in open position;

FIG. 14 shows an axonometric view, with separate parts, of a guillotine facing two second magnet interaction elements, here two magnetic slots adapted to be embedded in a floor;

FIGS. 15, 16 and 17 show three different cross sections of the lower edge of a sliding leaf in which the first section notes a second magnet placed side-by-side a sliding foot, the second section notes a first magnet facing a third magnet to exert the action of retraction on the guillotine, the third section notes a guide pin for the guillotine adapted to guide the sliding movement of the guillotine in the seat;

FIG. 18 shows a side view of a door with sliding leaf, in partially open position;

FIG. 19 shows a section of an edge of the leaf facing the floor, of an area among those indicated by 19*a* and 19*b* in FIG. 18;

FIG. 20 shows a section of an edge of the leaf facing the floor, of an area indicated by 20*a* in FIG. 18;

FIG. 21 shows a side view of a door with sliding leaf, in completely closed position;

FIG. 22 shows a section of an edge of the leaf facing the floor, of an area among those indicated by 22*a* and 22*b* in FIG. 18;

FIG. 23 shows a section of an edge of the leaf facing the floor, of an area indicated by 23*a* in FIG. 18;

FIG. 24 shows a side view of a detail of a door with sliding leaf, in open position;

FIG. 25 shows a section of an edge of the leaf facing the upper crosspiece of the door frame of the detail in FIG. 24, in which the guillotine is in retracted position;

FIG. 26 shows a section of an edge of the leaf facing the upper crosspiece of the door frame when the leaf is in completely closed position, in which the guillotine is in extended position;

FIG. 27 shows an axonometric view, with separate parts, of a guillotine of an upper edge of a leaf facing a crosspiece of door frame;

FIG. 28 shows an axonometric view, with separate parts, of a guillotine of an upper edge of a leaf facing a crosspiece of door frame according to a further embodiment in which second magnet interaction elements (8) are electromagnets (26) separated from said first magnet (A) and from said second magnet (B) and arranged so as to interact with said second magnet (B) to attract said second magnet (B) and exert an action of extraction on the guillotine (7).

DESCRIPTION OF SOME PREFERRED EMBODIMENTS

According to a general embodiment, a door 1 comprises:

a door frame or door fixture 2 comprising at least one abutment element 3;

a door leaf 4, which is movable from an open position, in which it opens an opening 5 delimited by said door frame or door fixture 2, and a closed position, in which it is resting against said abutment element 3 of said door frame or door fixture 2 to close said opening 5;

at least one guillotine seat or seat 6 provided in said door leaf 4 or in said door frame or door fixture 2;

at least one sliding element or guillotine 7 made of material having poor aluminum magnetic interaction; in which said guillotine 7 is slidably accommodated in said seat 6 so as to pass from a retracted position to an extended position and vice versa along a guillotine sliding direction X-X;

at least one first magnet A with poles N, S aligned or parallel to said guillotine sliding direction X-X;

said first magnet A being arranged integral with said guillotine 7;

said first magnet A exerting a magnetic action of attraction of said guillotine 7 into said seat 6;

at least one second magnet B, separated from said first magnet A, with poles N, S aligned or parallel to said guillotine sliding direction X-X;

said second magnet B being arranged integral with said guillotine 7;

at least one second magnet interaction element 8, separated by said first magnet A and by said second magnet B, and arranged so as to interact with said second magnet B and arranged integral with said abutment element 3 to attract said second magnet B to exert an action of extraction on guillotine 7;

said second magnet B being arranged so as to push said guillotine 7 to extract it from said seat 6 only when said second magnet B is arranged substantially facing said second magnet interaction element 8 or when said guillotine sliding direction X-X intercepts said second magnet interaction element 8;

said at least one first magnet A exerts a magnetic action which is globally lower than the magnetic action globally exerted by said at least one second magnet B.

According to one embodiment, said door frame or door fixture 2 comprises a seat wall 9 which delimits said seat 6. At least one third magnet C is arranged integral with said seat wall 9.

Said at least one first magnet A always faces said at least one third magnet C so as to perpetually attract said guillotine into said seat 6.

According to one embodiment, said door leaf 4 comprises at least one leaf edge 10, here a floor leaf edge, adapted to face an abutment element 3, in which said abutment element is a floor 11. Said seat 6 is provided in said floor leaf edge 10. Said guillotine 7 comprises a guillotine abutment surface 12 arranged facing said second magnet interaction element 8. Said guillotine abutment surface 12 comprises an acoustic seal 13 adapted to be interposed between said guillotine 7 and said abutment element 3.

According to one embodiment, said seat 6 defines a guillotine extraction and retraction direction or guillotine sliding direction X-X, in which said guillotine sliding direction X-X is arranged transversely to the plane defined by leaf 4 of door 1.

According to one embodiment, said seat defines a guillotine extraction and retraction direction or guillotine sliding direction X-X, in which said guillotine sliding direction X-X is arranged parallel to the plane defined by leaf 4 of door 1.

According to one embodiment, said seat 6 comprises a seat wall 9 which defines a seat wall bottom portion 16. Said guillotine 7 is a "U"-shaped profile 14 having a profile section opening 15, in which said profile 14 is accommodated in said seat 6 with the profile section opening 15 facing said seat wall bottom portion 16.

According to one embodiment, said at least one first magnet A is a series of first magnets A distributed along the longitudinal extension of guillotine 7.

According to one embodiment, said at least one second magnet B is a series of second magnets B placed at least close to longitudinal guillotine ends 17 of said guillotine 7.

According to one embodiment, said first magnet A has a predetermined polarity N/S. Said second magnet B has a predetermined polarity N/S. The arrangement of polarity N/S of the first magnet A is inverse with respect to the arrangement of polarity S/N of the second magnet B when they are positioned in said guillotine 7.

According to one embodiment, said door leaf 4 is a door leaf sliding on at least one guide 20 provided on said door frame or door fixture 2 so as to allow the door leaf 4 to slide laterally to said door frame or door fixture 2. Furthermore, at least one sliding foot 18 fixed to the abutment element 3, for example a floor 11, is provided. Said door frame or door fixture 2 comprises a feet seat 19 adapted to accommodate said sliding foot 18 to guide the sliding of said door leaf 4.

According to one embodiment, said second magnet interaction element 8 comprises a magnetic slot 21.

According to one embodiment, said second magnet interaction element 8 comprises a magnetic slot 21 embedded in said abutment element 3, for example a floor 11.

According to one embodiment, said door frame or door fixture 2 comprises a vertical frame side 22. Said guillotine comprises at least one second magnet B fixed to said guillotine and interfaced, only when the door leaf 4 is in closing position of said door 1, to a second magnet interaction element 8 comprising a strip made of material having a high magnetic interaction 23, e.g. steel.

According to one embodiment, said guillotine comprises at least one second magnet B fixed to said guillotine. Said door frame or door fixture 2 is placed straddling a length of floor 11. Said second magnet interaction element 8 comprises at least one magnetic slot 21 embedded in said floor 11 with polarity arranged inverse with respect to the polarity of the at least one second magnet B. Said second magnet B is fixed to said guillotine and interfaced to said at least one magnetic slot 21 only when the door leaf 4 is in closing position of door 1.

According to one embodiment, said door frame or door fixture 2 comprises a side of horizontal frame or crosspiece 24. Said second magnet interaction element 8 comprises at least one magnetic slot 21 embedded in said horizontal frame or crosspiece 24 with polarity arranged inverse with respect to the polarity of the at least second magnet B. Said second magnet B is fixed to said guillotine and interfaced to said at least one magnetic slot 21 only when the door leaf 4 is in closing position of door 1.

According to one embodiment, said door frame or door fixture 2 and said guillotine 7 are made of material having a low magnetic interaction, e.g. aluminum.

According to one embodiment, said second magnet B exerts an action of magnetic attraction which is at least four times greater than the magnetic action exerted by said first magnet A.

According to one embodiment, said first magnets A are neodymium magnets and/or said second magnets B are neodymium magnets and/or said third magnets C are neodymium magnets and/or said fourth magnets D are neodymium magnets.

The following is the description of the operation, by way of example, of a door with sliding leaf made according to the invention.

This embodiment provides a glass partition wall made so as to be soundproof, for example by providing double glass and a frame made of aluminum extrudates.

Also, door 1 comprises a door frame 2 made of aluminum extrudates. Likewise, the door leaf is made with double glass fixed to a frame which obtains the leaf edge 10 made of aluminum extrudates.

These leaf edges 10 have the different seats 6 on the lower side facing floor 11, on the vertical side facing the partition wall and the door frame 2, as well as on the upper side again facing the partition wall frame and the door frame 2.

Each seat accommodates a guillotine 7 made as described above and in particular, housing neodymium magnets.

The double-glass lower horizontal aluminum profile of the leaf edge 10 is shaped, in the lower part—the one oriented towards floor 11—so as to obtain said seat 6 and contain a second shaped aluminum profile therein which creates the support body of said guillotine. Said second aluminum profile is "U"-shaped and contains two series of magnets A, B therein, with the polarity thereof mutually oriented in inverse manner and different force of magnetic attraction or repulsing from each other. Third magnets C are arranged on the bottom of the seat and at the first magnets A, the third magnets being oriented so as to attract thereto the first magnets A position in the second "U"-shaped aluminum profile, preferably in the middle part of this profile.

Alignment pins or guide pins 25 for the guillotine are comprised in the horizontal aluminum profile of leaf edge 10, and in particular in said seats 6, the pins serving as guides to allow the vertical sliding of the second U-shaped aluminum profile in said seat 6 made in the lower crosspiece of leaf edge 10.

The magnetic slots 21, which are oriented so as to attract thereto the second U-shaped aluminum profile only when the leaf is in perfect closing position, are positioned on floor 11. In that moment, the second magnets B bring the second U-shaped profile towards the magnetic slots 21 (each containing a fourth permanent magnet D with the poles oriented inversely to the second magnet B in order to attract it thereto). The action of attraction between the second magnets B and the fourth magnets D overcomes the force of attraction of the first magnets A towards the third magnets C placed in the bottom of seat 6 and which oppose the extraction of guillotine 7, thus allowing the extension of guillotine 7 and the complete resting thereof on floor 11, thus ensuring the perfect closing of the horizontal gap below the door leaf 4.

When the user, opening the door leaf 4, moves the second magnets B with respect to the fourth magnets D, the first magnets A prevail again as action towards the third magnets C, retracting guillotine 7 into seat 6 and raising it off floor 11. Here, the extraction and retraction direction X-X of guillotine 7 is vertical or substantially orthogonal to the floor which embeds the two magnetic slots 21.

Guillotine 7 placed in the upper horizontal crosspiece placed in the leaf edge 10 operates in similar manner, except that the extraction and retraction direction X-X of guillotine 7 is substantially orthogonal to the plane on which the door leaf 4 lies, or in other words, is substantially parallel to the plane of floor 11.

With regards to the vertical abutment upright of the door frame 2 on the side where the quick release lock usually is provided, this has a continuous magnet which is the height of the H-shaped leaf and slides in a seat of the door frame 2 to horizontally slide with a stroke limited by a stop made in the door frame, but sufficient to abut against the leaf when in closed position. This magnet creates a magnetic seal and is made of substantially soft magnetic materials. The leaf edge 10 alternatively has, in the portion abutting against said vertical abutment upright of the door frame, a steel insert which is the width of the thickness of the leaf, or has, in the section of aluminum extrudate thereof, the space for housing a rod or steel strip 23. In closing step of leaf 4, the aforesaid magnetic seal perfectly adheres over the entire length of the edge of the leaf, where the steel strip 23 is provided.

With regards to the vertical sliding side, i.e. the side of the rear leaf with respect to the handle when the leaf is in closing step, a housing is formed in the vertical aluminum extrudate of the leaf edge 10, or "back" edge of leaf 4, for the entire height of the profile which creates the seat 6 for the guillotine 7. The seat 6 which receives a second U-shaped aluminum profile which makes the support body of said guillotine 7, which outer shape is adapted to receive a continuous seal for the entire length thereof. Two series of magnets A, B are fixed in the U-shaped profile, the first series with magnets A having less force and oriented opposite to the second series (second magnets B). The first magnets A are attracted by third magnets C fixed to the bottom of the seat 6 so that the guillotine 7 is attracted into the seat 6 until the second magnets B exert an action, free movement of the leaf being allowed during the closing and opening stroke and for the whole time in which the leaf remains open. The second series of magnets B has a greater magnetic force than the first series of magnets A so that the position of closed door, when the guillotine faces the vertical upright of the door frame 2 or sliding side of the door frame on which a hinge or steel strip 23 is provided to be inserted in a seat thereof, the U-shaped profile is stressed by the second magnet B, bringing the guillotine 7 to abut against the steel strip 23, and abutting the acoustic seal 13 against the whole vertical height of leaf 4. When the user acts on the opening leaf, the second magnets B are no longer aligned with the steel strip 23 and therefore, the first magnets A, which are perpetually attracted by the third magnets C fixed to the bottom of seat 6, attract the guillotine into seat 6, thus retracting and leaving leaf 4 immediately free to slide.

The present invention relates to a door with sliding leaf comprising one or more of the above-described features.

The present invention also relates to a door with hinged leaf comprising one or more of the above-described features.

The present invention also relates to leaves of wardrobes and furnishing containers. Here, the main function of the guillotine is the seal against dust, a significant problem for wardrobes and walk-in closets with sliding and/or hinged leaves.

According to one embodiment, said first magnet (A) is an electromagnet connected to an electrical activation and deactivation circuit 27, for example, but not necessarily, having a switch 29 controllable by a user to activate said first electromagnet (A). Therefore, a first electromagnet (A) may replace a first magnet (A) described in the preceding description.

According to one embodiment, said first electromagnet (A) interacts with a third electromagnet (C) or alternatively with a third magnet (C) or with an element made of material having a high magnetic interaction, e.g. steel, positioned where said third magnet (C) is described in the above description, without departing from the scope of the present invention.

According to one embodiment, said second magnet (B) is an electromagnet connected to an electrical activation and deactivation circuit 27, for example, but not necessarily, having a switch 29 which can be controlled by a user to activate said second electromagnet (B). Therefore, a second electromagnet (B) may replace a second magnet (B) described in the preceding description.

According to one embodiment, said second electromagnet (A) interacts with a fourth electromagnet (D) or alternatively with a fourth magnet (D) or with an element made of material having a high magnetic interaction, e.g. steel, placed where said fourth magnet (D) is described in the above description, without departing from the scope of the present invention.

According to one embodiment, at least one second magnet interaction element (8) is an electromagnet (26), separated by said first magnet or electromagnet (A) and by said second magnet or electromagnet (B), and arranged so as to interact with said second magnet or electromagnet (B) and arranged integral with said abutment element (3) to attract said second magnet or electromagnet (B) to exert an action of extraction on guillotine (7).

According to one embodiment, said at least one second magnet interaction element is an electromagnet 26 connected to an electrical activation and deactivation circuit 27, for example, but not necessarily, connected to a control unit 28 and having a switch 29 which can be controlled by a user to activate said at least one second magnet interaction element (8).

According to one embodiment, said second magnet interaction element is an electromagnet (8) and comprises a magnetic slot (21), or an electromagnet slot.

According to one embodiment, said second magnet interaction element is an electromagnet (8) and comprises a magnetic slot 21 embedded in said abutment element (2), for example a floor (11).

By virtue of the provision of electromagnets, a prompter control and mechanical activation may be obtained, but possibly also the activation of the guillotine by means of sensors or remote controls.

By virtue of the electromagnets, the door may be used, excluding the operation of the guillotines in everyday use and contrarily, activating them remotely also from the workstation or meeting table at the start of a meeting or a private call.

According to one embodiment, the electromagnets are connected to a domotics system to be activated and close the guillotines upon the switching from one setting scenario to another.

LIST OF REFERENCES

1 door
2 door frame or door fixture
3 abutment element
4 door leaf or leaf
5 door opening

6 guillotine seat or seat
7 sliding element or guillotine
8 second magnet interaction element or electromagnet
9 seat wall
10 leaf edge
11 floor
12 guillotine abutment surface
13 acoustic seal
14 profile
15 profile section opening
16 seat wall bottom portion
17 longitudinal guillotine ends
18 sliding feet
19 feet seat
20 sliding leaf guide
21 magnetic slot or element made of material having a high magnetic interaction or electromagnet
22 vertical frame side
23 strip made of material having a high magnetic interaction
24 horizontal frame or crosspiece
25 guillotine guide pin
26 electromagnet
27 electrical circuit
28 control unit
29 switch
X-X guillotine sliding direction
A first magnet or electromagnet
N north magnetic pole
S south magnetic pole
B second magnet or electromagnet
C third magnet or electromagnet or element made of material having a high magnetic interaction
D fourth magnet or magnetic slot or electromagnet or element made of material having a high magnetic interaction

The invention claimed is:

1. A door comprising:

a door frame or door fixture comprising at least one abutment element;

a door leaf, movable from an open position in which the door leaf opens an opening delimited by said door frame or door fixture, and a closed position in which the door leaf rests against said at least one abutment element of said door frame or door fixture to close said opening;

at least one seat provided in said door leaf or in said door frame or door fixture;

a seat wall delimiting said seat;

at least one guillotine, said guillotine being slidably accommodated in said seat to pass from a retracted position to an extended position and vice versa along a guillotine sliding direction (X-X);

at least one first magnet with poles aligned or parallel to said guillotine sliding direction (X-X);

said at least one first magnet being arranged integral with said guillotine;

said at least one first magnet exerting a magnetic action of attraction of said guillotine into said seat;

at least one second magnet, separated from said at least one first magnet, with poles aligned or parallel to said guillotine sliding direction (X-X);

said at least one second magnet being arranged integral with said guillotine;

at least one second magnet interaction element, separated from said at least one first magnet and said at least one second magnet, configured to interact with said at least one second magnet and arranged integral with said at least one abutment element to attract said at least one second magnet and exert an action of extraction on the guillotine;

said at least one second magnet being configured to push and extract said guillotine from said seat only when either (i) said at least one second magnet is arranged facing said at least one second magnet interaction element and/or (ii) when said guillotine sliding direction (X-X) intercepts said at least one second magnet interaction element;

wherein said at least one first magnet exerts a magnetic action lower than the magnetic action exerted by said at least one second magnet;

further comprising:

at least one third magnet arranged integral with said seat wall, said at least one first magnet always facing said at least one third magnet to perpectually attract said guillotine into said seat, or further comprising at least one electromagnet or magnetic field closing element arranged integral with said seat wall, said at least one first magnet always facing said at least one electromagnet or magnetic field closing element so as to attract said guillotine into said seat, and/or wherein said at least one second magnet interaction element is an electromagnet, separated from said at least one first magnet and said at least one second magnet, configured to interact with said at least one second magnet and arranged integral with said at least one second magnet and arranged integral with said at least one abutmet element to attract said at least one second magnet to exert an action of extraction on the guillotine, said at least one second magnet being configured to push and extract said guillotine from said seat only when either (i) said at least one second magnet is arranged facing said at least one second magnet interaction element and/or (ii) said guillotine sliding direction (X-X) intercepts said at least one second magnet interaction element;

wherein the action of attraction between said at least one second magnet and said second magnet interaction element overcomes the force of action of said at least one first magnet towards said at least one third magnet or said electromagnet or said magnetic field closing element, thus allowing the extension of said guillotine and the complete resting thereof on a floor, ensuring the closing of a horizontal gap below said door leaf.

2. The door of claim 1, wherein the action of attraction between said at least one second magnet and said second magnet interaction element overcomes the force of action of said at least one first magnet towards said at least one third magnet or said electromagnet or said magnetic field closing element, thus allowing the extension of said guillotine and the complete resting thereof on a floor, ensuring the closing of a horizontal gap below said door leaf.

3. The door of claim 1, wherein said door leaf comprises at least one floor leaf edge configured to face said at least one abutment element, wherein said at least one abutment element is a floor;

said seat is provided in said at least one floor leaf edge;

said guillotine comprises a guillotine abutment surface arranged facing said at least one second magnet interaction element;

said guillotine abutment surface comprises an acoustic seal configured to be interposed between said guillotine and said at least one abutment element.

4. The door of claim 1, wherein said seat defines the guillotine sliding direction (X-X), and wherein said guillotine sliding direction (X-X) is arranged transversely to a plane defined by the door leaf;

or wherein said seat defines the guillotine sliding direction (X-X), and wherein said guillotine sliding direction (X-X) is arranged parallel to the plane defined by the door leaf.

5. The door of claim 1, wherein said seat comprises a seat wall defining a seat wall bottom portion; and said guillotine is a "U"-shaped profile having a profile section opening, and wherein said "U"-shaped profile is accommodated in said seat with the profile section opening facing said seat wall bottom portion.

6. The door of claim 1, wherein said at least one first magnet is a series of first magnets distributed along a longitudinal extension of the guillotine.

7. The door of claim 1, wherein said at least one first magnet has a predetermined polarity;

said at least one second magnet has a predetermined polarity;

and wherein an arrangement of the predetermined polarity of the at least one first magnet is inverse with respect to the arrangement of the predetermined polarity of the at least one second magnet when the at least one first and second magnets are positioned in said guillotine;

or wherein said at least one first magnet is a first electromagnet;

said at least one second magnet is a magnetic field closing element;

and wherein, when activated, said first electromagnet generates a magnetic attraction with said magnetic field closing element.

8. The door of claim 1, wherein said door leaf is a door leaf sliding on at least one guide provided on said door frame or door fixture to allow the door leaf to slide laterally to said door frame or door fixture;

and wherein at least one sliding foot fixed to the at least one abutment element is provided; and said door frame or door fixture comprises a feet seat configured to receive said at least one sliding foot to guide sliding movement of said door leaf.

9. The door of claim 1, wherein said at least one second magnet interaction element comprises at least one of the group consisting of a magnetic slot, a magnetic field closing element and an electromagnet.

10. The door of claim 1, wherein said door frame or door fixture comprises a vertical frame side; and said guillotine comprises at least one second magnet fixed to said guillotine and interfaced, only when the door leaf is in a closed position, to a second magnet interaction element comprising a strip made of magnetic material.

11. The door of claim 10, wherein said magnetic material is steel.

12. The door of claim 1, wherein said guillotine comprises at least one second magnet fixed to said guillotine;

said door frame or door fixture is placed straddling a length of a floor;

said at least one second magnet interaction element comprises at least one magnetic slot, or an element made of a magnetic material, embedded in said floor with a polarity arranged inverse with respect to the polarity of the at least one second magnet;

said at least one second magnet is fixed to said guillotine and interfaced to said at least one magnetic slot, or element made of a magnetic material, only when the door leaf is in a closed position.

13. The door of claim 1, wherein said door frame or door fixture comprises a side of horizontal frame or crosspiece;

said at least one second magnet interaction element comprises at least one magnetic slot, or an element made of a magnetic material, embedded in said horizontal frame or crosspiece with a polarity arranged inverse with respect to the polarity of the at least one second magnet;

said at least one second magnet is fixed to said guillotine and interfaced to said at least one magnetic slot only when the door leaf is in a closed position.

14. The door of claim 1, wherein said door frame or door fixture and said guillotine are made of a nonmagnetic material.

15. The door of claim 14, wherein said nonmagnetic material is aluminum.

16. The door of claim 1, wherein said at least one second magnet exerts a magnetic action at least four times greater than the magnetic action exerted by said at least one first magnet.

17. The door of claim 1, wherein said magnetic field closing element is an element made of a magnetic material.

18. The door of claim 1, wherein said at least one second magnet is a series of second magnets placed at least close to longitudinal guillotine ends of said guillotine.

19. The door of claim 1, wherein said at least one second magnet interaction element comprises a magnetic slot embedded in said at least one abutment element.

20. The door of claim 1, wherein said at least one second magnet interaction element comprises a magnetic slot comprising an electromagnet.

* * * * *